Figure 1:
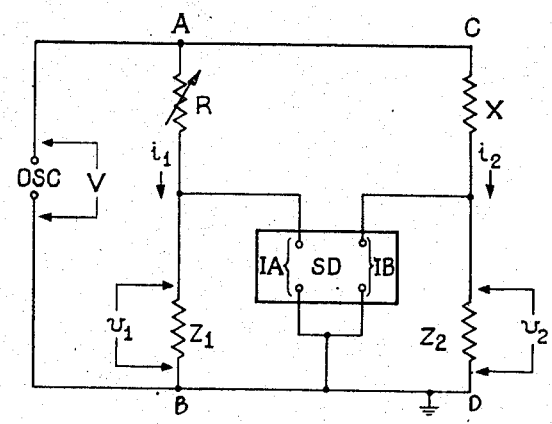

Nov. 4, 1952

J. R. CANNON 2,616,948

ELECTRICAL MEASURING APPARATUS

Filed Nov. 22, 1948

3 Sheets-Sheet 1

INVENTOR.
JAMES ROWAN CANNON.

BY
ATTORNEY.

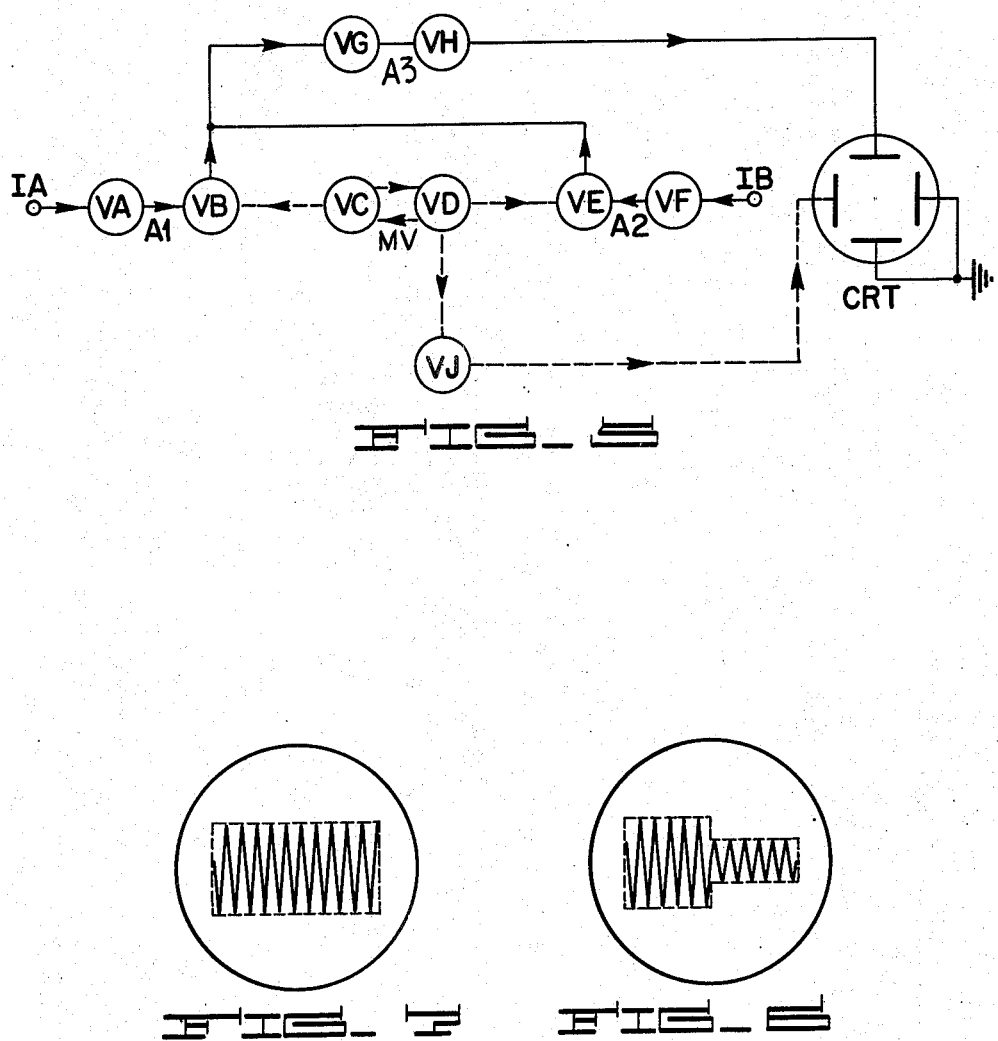

Patented Nov. 4, 1952

2,616,948

UNITED STATES PATENT OFFICE 2,616,948

ELECTRICAL MEASURING APPARATUS

James Rowan Cannon, Liverpool, England, assignor to Automatic Telephone & Electric Company Limited, Liverpool, England, a British company Application November 22, 1948, Serial No. 61,456
In Great Britain December 5, 1947

8 Claims. (Cl. 175—183)

The present invention relates to improvements in electrical measuring apparatus and is more particularly concerned with the determination of characteristics of equipment or components when alternating current is applied thereto.

There is disclosed in British specification No. 569,279, an arrangement for determining the transmission characteristics of electrical apparatus such as filters, equalisers, amplifiers and like equipment which may be used in carrier telephone systems. In that arrangement alternating current at a predetermined frequency is applied by way of two circuits, one of known characteristics and the other to be tested, to a so-called sensitive detector embodying an electronic switching device and an indicating device such as a cathode-ray tube. The switching device, automatically and continuously switching from one circuit to the other, extends the output current signals from the two circuits alternately to the cathode ray tube. The sensitive detector is so arranged that traces representative of the signals and consequently of the transmission characteristics of the two circuits appear on the screen of the tube in juxtaposition so as to permit direct comparison of the characteristics.

The present invention is concerned with the combination of the above-described sensitive detector with suitable circuit arrangements to provide a composite measuring apparatus for field and factory testing of equipment and components for use in carrier telephone equipment or the like.

Broadly speaking, therefore, the object of the invention is to provide means for simply and rapidly determining, at any frequency within a predetermined range, the modulus of an impedance and the return loss of one impedance against another.

According to one feature of the invention, a measuring set for determining the modulus of an impedance comprises a circuit having two branches fed from a common source of alternating current each branch including an impedance, said impedances having a known ratio one to the other while one branch includes a calibrated variable standard impedance and the other includes the impedance to be measured, the voltage developed across said first mentioned impedances being applied to a sensitive detector of the cathode ray oscilloscope type in such a manner as to enable the standard and unknown impedances to be compared from the traces appearing in juxtaposition upon the screen of the cathode ray tube.

According to another feature of the invention, a measuring set is provided for the comparison of two impedances in terms of their return loss in suitable transmission units. Return loss is the power reflected or returned toward the sending end of a system by reason of an impedance mismatch between the sending and receiving equipment, and may be defined as the ratio of the power available for delivery to a matched impedance to the reflected power. Such a measuring set comprises a circuit having two similar branches, each including one of the impedances to be compared supplied from a common source of alternating current and including transformers so arranged that signals indicative of the difference current in the branches are applied directly to one pair of input terminals of a sensitive detector whilst signals indicative of the sum of the currents in said branches are applied to another pair of input terminals of the sensitive detector by way of a variable attenuator calibrated in suitable transmission units, said attenuator indicating the return loss directly when adjusted until the traces representing said signals and appearing in juxtaposition on the screen of the sensitive detector are of equal amplitude.

The invention will be better understood from the following description of various embodiments taken in conjunction with the accompanying drawings.

Figure 2:
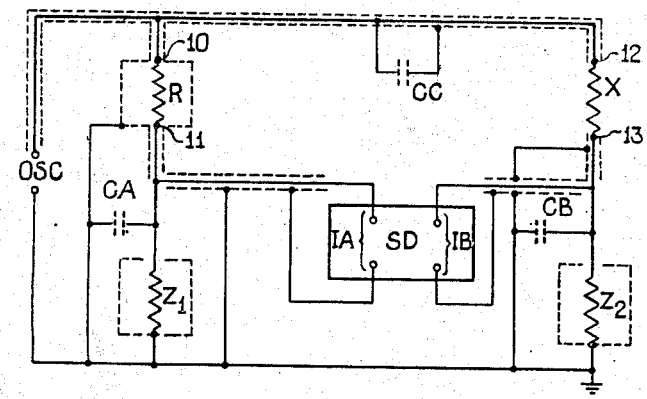
Figure 3:
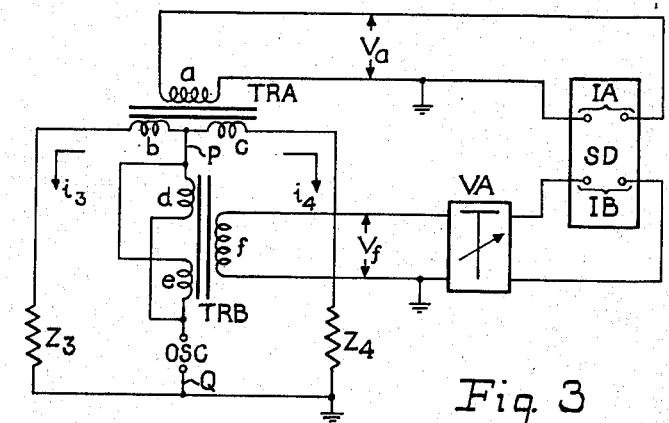
Figure 4:
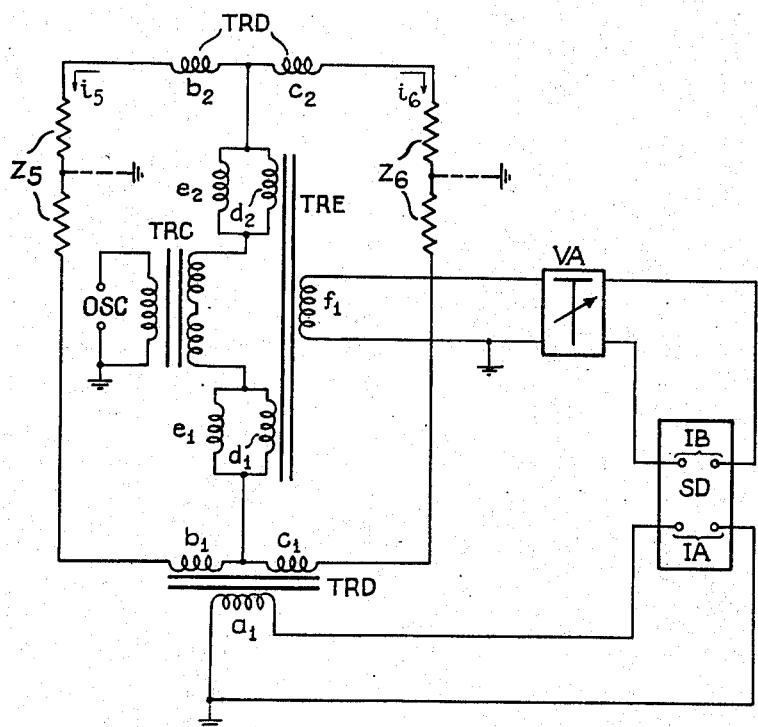

In the drawings, Fig. 1 is a circuit of the impedance measuring set while Fig. 2 shows one method of suitably screening the impedance measuring set. Fig. 3 is the circuit of the return loss measuring set for unbalanced impedances and Fig. 4 is a measuring set of similar type for balanced impedances. Fig. 5 is a block diagram of a sensitive detector as described in detail in said British specification No. 569,279. Fig. 6 indicates the appearance of the display screen of such a sensitive detector when two unequal signals are being compared and Fig. 7 its appearance when the signals compared have been brought to equality.

The circuit of the impedance measuring set shown in Fig. 1 may be used for the measurement of the modulus of impedances when speed and ease of manipulation, rather than extreme accuracy, are the prime requirements as in the case of measurement of transformer and choke characteristics when the general shape of the impedance/frequency curve is usually of greater importance than very accurate impedance measurement at any particular frequency. Referring to Fig. 1 the variable frequency oscillator is connected to a circuit arrangement comprising four arms, R which is the standard decade resistance box, X which is an unknown impedance and two resistors $Z_1$ and $Z_2$. The latter two resistors, which are not of necessity high grade non-reactive components, may comprise commercial type wire-wound and substantially non-inductive spools having similar phase angles and being of equal D. C. resistance so that the ratio of their impedances remains substantially constant and equal to unity. If need be the ratio of the impedances may be other than unity, providing that the ratio is known and due allowance is made therefor. Resistors $Z_1$ and $Z_2$ are selected by means of a switch-adjustable potentiometer tapped for example to give values of 0.1, 1.0, 10 and 100 ohms, which range of adjustments will suffice for the measurements of impedances of the order of 10 to 100,000 ohms. The particular values chosen are dependent upon the unknown impedance and to obtain an accuracy of measurement within .2 per cent, $Z_1$ should not exceed 1½ per cent of R.

The sensitive detector SD which may be substantially similar to that described in the prior specification No. 569,279 has one pair of input terminals IA connected across the resistor $Z_1$ and the other pair IB connected across $Z_2$.

Such a sensitive detector is illustrated in block form in Fig. 5. The signal fed to input IA is amplified by the individual two-stage amplifier A1 comprising valves VA and VB and after receiving further amplification by the common amplifier A3 comprising valves VG and VH is applied to the vertical deflector plates of the tube CRT. Input IB is likewise amplified by amplifiers A2 and A3 and is delivered to the same pair of deflector plates.

The outputs from amplifiers A1 and A2 are, however, not connected simultaneously to amplifier A3, but alternately, this being achieved by means of the multivibrator MV comprising the valves VC and VD which interact in known manner so that they are alternately conducting and non-conducting and which alternately bias the output valves VB and VE of each of the individual amplifiers beyond cutoff, thus gating them in a well-known manner.

The multivibrator MV also serves to control the triggering of the time-base valves VJ so that the cathode ray tube sweep frequency is positively locked into the switching frequency. During the first half of any one sweep of the tube the vertical deflection is obtained via one individual amplifier and during the second half via the other individual amplifier. Since the signal frequency will usually be very much higher than the switching frequency which will conveniently be of the order of 50 cycles per second, the appearance of the picture on the tube screen will thus be two illuminated rectangles of equal breadth as shown in Fig. 6, the height of the rectangle being directly proportional to the magnitude of the applied voltages to the inputs IA and IB. With the two voltages made equal by suitable adjustment of a variable attenuator, as will later be described, the appearance of the screen is as shown in Fig. 7.

The method of determining the modulus of the unknown impedance at a predetermined frequency will now be described. Suitably low values of $Z_1$ and $Z_2$ are inserted and the appropriate frequency is applied by the oscillator. Now the same voltage V is applied across both branches AB and CD of the circuit so that if the currents in these branches are represented by $i_1$ and $i_2$ respectively and the unknown impedance as a vector quantity $\dot{X}$ then $$|i_1|=\left|\frac{V}{R+Z_1}\right| \text{ and } |i_2|=\left|\frac{V}{\dot{X}+Z_2}\right|$$

The two currents are adjusted to be equal by varying the value of R until the displays appearing in juxtaposition on the screen of the sensitive detector are of equal amplitude. This is indicative of the voltages $V_1$ and $V_2$ across $Z_1$ and $Z_2$ being equal. It then follows that $$\left|\frac{V}{R+Z_1}\right|=\left|\frac{V}{\dot{X}+Z_2}\right| \text{ and that } |R+Z_1|=|\dot{X}+Z_2|$$

However $Z_1$ and $Z_2$ were made negligibly small compared with R and X therefore $R=|\dot{X}|$. It will be apparent that the arrangement is considerably more simple and speedy in operation than the conventional type of impedance measuring bridge in that, once having chosen suitable values for $Z_1$ and $Z_2$ only one adjustment is necessary. This is particularly advantageous in the preparation of an impedance/frequency curve of a component. It will further be apparent that had the ratio $Z_1:Z_2$ been other than unity, then the ratio $R:|\dot{X}|$ would have been the same when the traces on the screen were made equal in amplitude.

Fig. 2 shows one arrangement of the impedance measuring set suitably screened to minimize the effect of stray couplings when high frequencies are employed and/or very high impedances are to be measured. The screens are shown by broken lines and are all connected to earth, but it is important to note that any screen on the component to be measured or the frame thereof should be connected to terminal 12, otherwise the effect of the capacities to earth of such screen or frame will be included in the measurement. In order to further minimize the liability of pick up it will be of advantage to use a low impedance oscillator.

The effect of the capacitances introduced by the screen may be investigated as follows: The total capacity (CC) to screen of that portion of the circuit from the high potential terminal of the oscillator and terminals 11 and 12 or R and X respectively is shunted across the oscillator output and is consequently ineffective. The capacitances due to the other screening resolve themselves into CA and CB which are in effect shunted across arms $Z_1$ and $Z_2$ respectively. Since these arms are of comparatively low impedance the shunting effect of the capacitances may be ignored for the majority of measurements, particularly if care is taken in the physical lay-out of the measuring set components to reduce CA and CB to the smallest possible values. Further if necessary a small capacitor may be introduced to obtain an accurate balance between CA and CB.

It may be pointed out that for the measurement of high impedances it may be convenient to replace the resistance box R by a standard low reading variable capacitor.

Referring now to Fig. 3, which is a circuit for a return loss measuring set, and is in effect a means for comparing an unbalanced impedance expressed as a vector quantity $Z_4$ with a standard impedance $Z_3$ frequently but not necessarily non-reactive and for expressing the degree of out of balance of the two impedances in decibels. The apparatus will find particular application in carrier telephony in determining the characteristics of input and/or output impedances of equipments such as modulators, amplifiers and attenuators for impedance matching purposes.

First it should be noted that the return loss at a given frequency of an impedance expressed as a vector quantity $Z_4$ against another impedance $Z_3$ has been defined by $$S = 20 \log_{10} \left| \frac{Z_3 + Z_4}{Z_3 - Z_4} \right|$$

Now transformers TRA and TRB are of the type normally employed as hybrid transformers in transmission circuits and are of substantially identical construction and have turns ratios such that the impedance introduced into the circuit branches by way of windings $b$ and $c$ is negligible compared with the values of $Z_3$ and $Z_4$. The low impedance primary winding $b$ and $c$ of the transformer TRA comprise a twin twisted pair of conductors and are consequently substantially equal and each have equal turns ratios, of the order 1 to 10, with the secondary winding $a$. The same considerations apply to the windings of $d$, $e$ and $f$ of transformer TRB but in this case the windings $d$ and $e$ are connected in parallel and the same sense while windings $b$ and $c$ are connected in the normal hybrid transformer manner i. e. series opposing.

The components whose return loss is to be determined are the standard impedances $Z_3$ and $Z_4$ which may be the terminating impedance of one of the aforesaid carrier telephone equipments, and these components are connected one in each of the substantially similar branches of the measuring set. The variable frequency oscillator OSC set at a predetermined frequency is connected in the path serving both branches and produces a voltage V across points P and Q, and the branch currents expressed vectorially as $i_3$ and $i_4$ flow through $Z_3$ and $Z_4$ respectively.

Transformer TRA winding $a$ connects directly with a pair of input terminals IA of the sensitive detector SD which is of the type previously referred to. Transformer TRB winding $f$ extends to the other pair of detector input terminals IB by way of the variable attenuator VA.

Now $$i_3 = \frac{V}{Z_3} \text{ and } i_4 = \frac{V}{Z_4}$$

since the impedance introduced into the branch circuits by TRA is negligible. It will be assumed that transformer windings $a$ and $f$ terminate on impedances of substantially 600 ohms and that the turns ratios of windings $b$ to $a$ and $d$ to $f$ are each $1:n$. Since windings $b$ to $c$ are in series opposition then, across winding $a$, the potential difference $$Va = \left| \frac{i_3 - i_4}{n} \right| 600$$

and, since windings $d$ and $e$ are parallel aiding, across winding $f$ the potential difference $$Vf = \left| \frac{i_3 + i_4}{n} \right| 600$$

To determine the return loss the attenuator VA, which is calibrated in decibels, is now adjusted until the two input voltages to the sensitive detector are equal as indicated by the equality of amplitude of the traces appearing in juxtaposition on the screen of the detector.

Assuming that an attenuation A decibels is introduced by the attenuator to obtain the trace equality then $$A = 20 \log_{10} \left| \frac{Vf}{Va} \right|$$

$$= 20 \log_{10} \left| \frac{i_3 + i_4}{i_3 - i_4} \right|$$

$$= 20 \log_{10} \left| \frac{\frac{V}{Z_3} + \frac{V}{Z_4}}{\frac{V}{Z_3} - \frac{V}{Z_4}} \right|$$

$$= 20 \log_{10} \left| \frac{Z_3 + Z_4}{Z_3 - Z_4} \right|$$

which equals the return loss at the predetermined frequency of $Z_4$ against $Z_3$ in decibels. It follows that the attenuator indicates the return loss directly.

It will be apparent that, by applying the above methods, a return loss/frequency curve may be derived in a few minutes by simply setting the oscillator successively at each of a plurality of frequencies covering the working range of the component to be tested and by adjusting the attenuator until the traces appearing in juxtaposition on the screen of the cathode ray tube are equal in amplitude.

Referring now to Fig. 4 which shows the return loss measuring set adapted for determining the return loss of a pair of impedances $Z_5$ and $Z_6$ each balanced with respect to earth.

Impedance $Z_5$ represents the standard balanced impedance while $Z_6$ may be a balanced transmission line or the input or output impedance of the component whose return loss is to be found.

The substantially similar transformers TRD and TRE correspond respectively in function to transformers TRA and TRB referred to in connection with Fig. 3 while transformer TRC serves to couple the output of the variable frequency oscillator OSC equally to the upper and lower portions of the centre limb of the circuit including the primary windings $e_2$, $d_2$, $e_1$ and $d_1$ of transformer TRE. The latter primary windings have equal characteristics and are connected in the same sense. The primary windings $b_1$, $c_1$, $b_2$ and $c_2$ of transformer TRD also have equal characteristics but are connected in such a manner that $b_2$ and $c_2$ oppose and $b_1$ and $c_1$ also oppose, while $b_2$ and $b_1$ assist and $c_2$ and $c_1$ also assist.

It will be apparent that the upper and lower portions of the circuits embracing all the primary windings of transformers TRD and TRE are identical and that the voltage appearing across the secondary winding $a_1$ of TRD is indicative of the total current differences in $Z_5$ and $Z_6$ while the voltage appearing across the secondary winding $f_1$ of TRE is indicative of the sum of the currents flowing in $Z_5$ and $Z_6$.

The method of determining the return loss is similar to that described in conjunction with Fig. 3 and relating to unbalanced impedances. Assume as in the case of Figure 3 that the transformer windings $a_1$ and $f_1$ terminate on impedances of substantially 600 ohms and that the turns ratio of windings $b_1$ and $b_2$ to $a_1$ and $d_1$ and $d_2$ to $f_1$ is $1:R$. Then $$V_{a_1} = \left( \frac{i_5 - i_6}{R} \right) 600 \text{ and } V_{f_1} = \left( \frac{i_5 + i_6}{R} \right) 600$$

The attenuator VA is adjusted as described for

Figure 3 whereupon if the attenuation introduced is A decibels, it can be shown in exactly the same way as indicated for Figure 3 that $$A = 20 \log_{10}\left(\frac{Z_5 + Z_6}{Z_5 - Z_6}\right)$$

I claim:

1. A measuring apparatus for the comparison of two impedances in terms of their return loss in suitable transmission units comprising a circuit having two similar branches, each including one of the impedances to be compared, connections for supplying said circuit from a common source of alternating current, transformer means connected in said circuit and comprising coils excited respectively by the sum and difference currents in the branches, a sensitive detector of the cathode ray oscilloscope type providing means for direct comparison of the amplitude of two signals applied to two sets of input terminals, the transformer coil excited by the difference currents being connected to one of said sets and those excited by the sum currents to the other, and a variable attenuator calibrated in suitable transmission units interposed between the sum-excited coils and said other set of terminals, said attenuator indicating the return loss directly when adjusted until the traces representing said signals and appearing in juxtaposition on the screen of the sensitive detector are of equal magnitude.

2. A measuring apparatus as claimed in claim 1 in which the transformer means are hybrid transformers of the type used in transmission circuits.

3. A measuring set as claimed in claim 1 in which a primary winding of one transformer means is arranged in each of said branches, and the common source of alternating current in series with the parallel connected primary windings of another transformer means is connected between the junction of the two impedances and the junction of the first-mentioned primary windings whereby the first-mentioned primary windings are in series opposition and the second-mentioned primary windings are in the same sense.

4. A measuring set as claimed in claim 1 and adapted for the comparison of two balanced impedances in terms of their return loss in decibels wherein said transformer means comprises a pair of hybrid transformers of the type used in transmission circuits wherein one transformer has two pairs of primary windings and the second transformer has two pairs of parallel-connected primary windings in which one primary winding of each of two pairs of primary windings of one transformer is arranged on each side of the impedance in each of said branches and the two pairs of parallel-connected primary windings of the second transformer in series with and one on each side of the common source of alternating current are connected between the junctions of the pairs of first-mentioned primary windings whereby the pairs of first-mentioned primary windings are in series opposition and the pairs of second-mentioned primary windings are in the same sense.

5. Measuring apparatus for the comparison of two impedances in terms of their return loss in suitable transmission units comprising a circuit having two similar branches each including one of the impedances to be compared, a source of alternating current included in said circuit, at least one transformer having its primary windings included in said circuit and its secondary winding arranged to respond to the difference in current flow in said branches, at least one further transformer having its primary windings included in said circuit and its secondary winding arranged to respond to the sum of the currents flowing in said branches, a sensitive detector including a cathode ray tube and having two pairs of input terminals, means for connecting the secondary winding of said one transformer to one pair of said input terminals, a variable attenuator calibrated in suitable transmission units and means for connecting the secondary winding of said further transformer through said attenuator to the other pair of said input terminals whereby said attenuator indicates the return loss directly when adjusted until the traces representing the outputs from said two transformers and appearing in juxtaposition on the screen of said tube are of equal amplitude.

6. Measuring apparatus for the comparison of two impedances in terms of their return loss in suitable transmission units comprising a circuit having two similar branches each including one of the impedances to be compared, and a third branch connected in parallel with said two branches, a source of alternating current included in said third branch, a first transformer having two primary windings connected in parallel and in the same sense in said third branch, a second transformer having two primary windings connected in series opposition in said two branches, a sensitive detector including a cathode ray tube and having first and second pairs of input terminals, means for connecting the secondary winding of said second transformer to said first pair of said input terminals, a variable attenuator calibrated in suitable transmission units and means for connecting the secondary winding of said first transformer through said attenuator to said second pair of input terminals whereby said attenuator indicates the return loss directly when adjusted until the traces representing the outputs from said first and second transformers and appearing in juxtaposition on the screen of said tube are of equal amplitude.

7. Measuring apparatus for the comparison of two impedances in terms of their return loss in suitable transmission units comprising a circuit having two similar branches each including one of the impedances to be compared and a third branch connected in parallel with said two branches, a first transformer having two pairs of primary windings in said third branch, each pair connected in parallel and the two pairs connected in the same sense, a source of alternating current, a second transformer having its primary winding connected in circuit with said source and its secondary winding connected in said third branch between the two pairs of primary windings of said first transformer, a third transformer having two pairs of primary windings, each pair connected in series opposition in said two branches, a sensitive detector including a cathode ray tube and having two pairs of input terminals, means for connecting the secondary winding of said third transformer to one pair of said input terminals, a variable attenuator calibrated in suitable transmission units and means for connecting the secondary winding of said first transformer through said attenuator to the other pair of input terminals whereby said attenuator indicates the return loss directly when adjusted until the traces representing the output from said first and third transformers and appearing in juxtaposition on the screen of said tube are of equal amplitude.

8. Measuring apparatus as claimed in claim 7 wherein said transformers comprise hybrid transformers of the type used in transmission circuits.

JAMES ROWAN CANNON.

REFERENCES CITED

The following references are of record in the file of this patent:

UNITED STATES PATENTS

| Number | Name | Date |
|---|---|---|
| 1,684,397 | Hubbard | Sept. 18, 1928 |
| 1,684,403 | Mason | Sept. 18, 1928 |
| 1,848,134 | Lambert | Mar. 8, 1932 |
| 2,081,690 | Unk | May 25, 1937 |
| 2,249,164 | Olson | July 15, 1941 |
| 2,409,419 | Christaldi | Oct. 15, 1046 |

FOREIGN PATENTS

| Number | Country | Date |
|---|---|---|
| 246,963 | Great Britain | Feb. 11, 1926 |
| 431,731 | Great Britain | July 15, 1935 |
| 569,279 | Great Britain | May 16, 1945 |